United States Patent [19]

Quinlan

[11] 3,995,917
[45] Dec. 7, 1976

[54] ALUMINUM BRONZE BEARING

[75] Inventor: John R. Quinlan, Buena Park, Calif.

[73] Assignee: Smith International, Inc., Newport Beach, Calif.

[22] Filed: Sept. 24, 1975

[21] Appl. No.: 616,401

Related U.S. Application Data

[62] Division of Ser. No. 418,310, Nov. 23, 1973, abandoned.

[52] U.S. Cl. .................................. 308/8.2; 148/32
[51] Int. Cl.² ........................................ F16C 19/00
[58] Field of Search ............. 308/8.2; 148/32, 32.5; 75/162

[56] References Cited

UNITED STATES PATENTS

| | | | |
|---|---|---|---|
| 2,944,889 | 7/1960 | Klement | 75/162 |
| 3,620,580 | 11/1971 | Cunningham | 308/8.2 |
| 3,823,030 | 7/1974 | Hudson | 308/8.2 |

*Primary Examiner*—M. H. Wood, Jr.
*Assistant Examiner*—Richard A. Bertsch

[57] ABSTRACT

A bearing and bearing material adapted for use with a relatively movable bearing member or bearing material having a considerably greater hardness, the bearing material of the invention comprising aluminum bronze which is heat treated to create therethrough particles of harder material than the aluminum bronze prior to heat treating, said particles being harder than the matrix in which they are dispersed. Preferably, this material is used as a complement to a harder relatively movable bearing surface, such as hard metals known in the art, which are deposited upon supporting bodies, usually by a weld operation.

10 Claims, 5 Drawing Figures

ALUMINUM BRONZE AS DEPOSITED
HARDNESS Rc 39      200X

ALUMINUM BRONZE AFTER HEAT TREATING
HARDNESS Rc 27 (BULK)
ARTICLE HARDNESS 46 Rc    200X

ALUMINUM BRONZE BEARING

This is a division, of application Ser. No. 418,310 filed 11/23/73 now abandoned.

This invention relates to a bearing material and bearing structure wherein the material of the invention is adapted for use in connection with a cooperating relatively movable bearing or bearing material overlay having considerable hardness, the bearing material of the invention including aluminum bronze which is heat treated, with the resultant production of particles in a disperse phase in a matrix, the particles being of greater size than the particles of the aluminum bronze prior to heat treating, and the particles having a considerably greater degree of hardness than the matrix in which they are dispersed.

The invention also is directed to a bearing material as mentioned above wherein the disperse phase particles in the heat treated aluminum bronze, while harder than the matrix in which they are dispersed, are considerably softer than the material with which they are to be used and with which they cooperate in relatively movable contact.

Another object of the invention is to provide a bearing structure wherein there are two relatively movable parts, one of which is provided with or comprises a material of considerable hardness and commonly known as "hard metal", and the other material is heat treated aluminum bronze with disperse phase particles therein, the particles having a greater degree of hardness than the matrix through which they are dispersed and a lesser degree of hardness than the hard metal.

Another object of the invention is to provide a bearing material and method of preparing the same wherein aluminum bronze is overlaid in a groove in a bearing surface in a supporting body and the bearing material of aluminum bronze is then heat treated so that the material after heat treating, is in position in the site in which it is intended to function.

Other objects and advantages of the invention will more fully appear from the following description in connection with the accompanying drawing.

Figure 1:
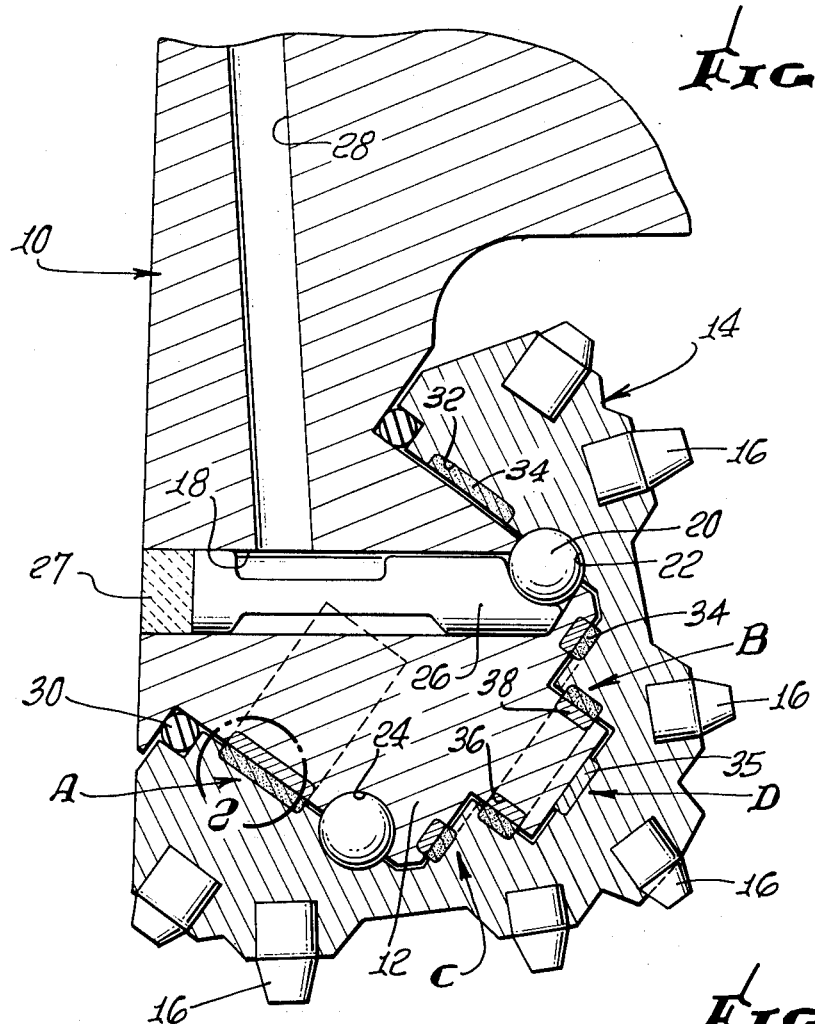
FIG. 1 is a sectional view taken axially through a rotary cone rock bit and through portions of the bit body including the journal upon which the cone rotates.
Figure 2:
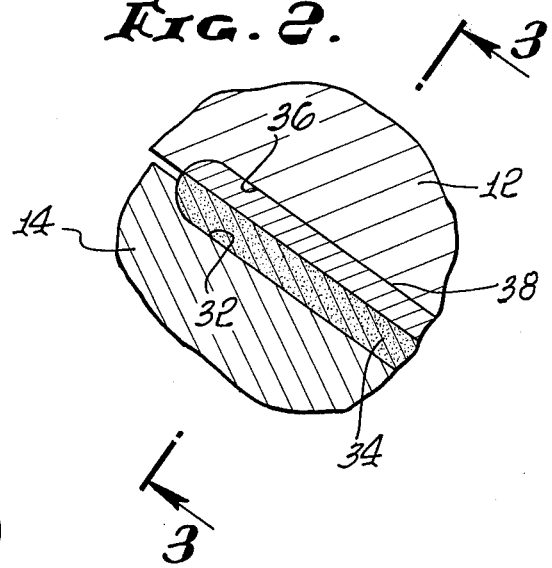
FIG. 2 is an enlarged sectional detail taken approximately on the line 2 of FIG. 1.

In the drawing there is shown a rotary rock drill body 10 having a diagonally downwardly extending journal portion 12 upon which a rotary cone cutter 14 is adapted to rotate, the cutter customarily having metal inserts 16, as indicated.

The bit body 10 is provided with a passageway 18 through which ball bearings 20 are inserted to a ball race 22 in the cutter and a complementary race 24 in the journal 12. A plug 26 fills the inner portion of the bore 18 and the plug is retained in position by a conventional filler material 27. As is well known in the art, a lubricant is fed through a passage or bore 28 to the bore 18 and thence past the plug 26 to the ball bearings 20 and other bearing surfaces between the rotary cone 14 and the journal 12. Escape of lubricant from the bearing area within the cone and the prevention of the entry of cuttings and other foreign materials from the outside is sealed off by a suitable seal, such as the 0-ring 30. This also is a conventional arrangement.

In addition to the ball bearings 20, it is customary in rock bits of this type and related devices, to have some bearing means at the area A and at the reduced end area B, these bearing means lying about the journal 12. It is also customary to have bearing means or surfaces taking care of thrust at areas such as C and D. Frequently at area A roller bearings are provided. At areas B, C and D, it is customary to provide bearing material in the form of inserts or deposits in the form of weld metal overlays, the latter of course being metal of a considerable degree of hardness.

Of course the location of bearing areas and their extent can be varied to suit different conditions of use, and also of course to suit the particular wishes of the tool designers or purchasers. However, illustrated in the drawing are the areas A, B, C and D, which are merely exemplary of bearing locations and relative sizes which may or may not be used in any specific instance.

In FIG. 1 the bearing areas A, B, C and D, in the rotary cone 14, are provided with shallow grooves 32 filled with hard metal 34 which is placed in a welding operation and is known as an overlay. A similar operation is generally performed on the opposed face portions of the journal 12 or other part upon which the member 14 or other movable element is adapted to rotate. A thrust button 35 lies between the inner end of the cone 14 and the end of the leg journal 12.

Figure 3:
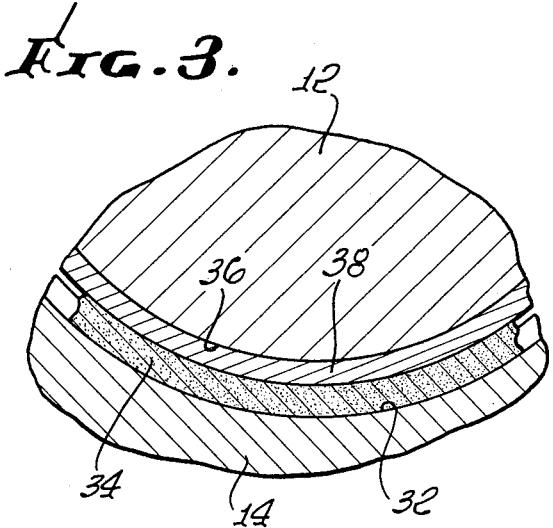
FIG. 3 is an enlarged section taken approximately on the line 3—3 of FIG. 2.

My preferred method of making a bearing and processing the material thereof is to provide a groove or grooves in one of the relatively movable elements, such as the cone 14. In the illustrated embodiment the cone is first subjected to a carburizing atmosphere at a heat of 1700° F. for 10–14 hours. Prior to carburizing, I provide one or more grooves 36 in the cone 14 in areas A, B, C & D, and in the grooves deposit a weld overlay of aluminum bronze 34. There is shown an enlarged detail in FIG. 3 taken on A on FIG. 1.

After the aluminum bronze is deposited, the part which carries the aluminum bronze, and more specifically, in accordance with the drawing, the cone 14 is heated to a temperature of approximately 1500° F. It is then oil quenched and then tempered at a heat of 350° F.

Figure 4:
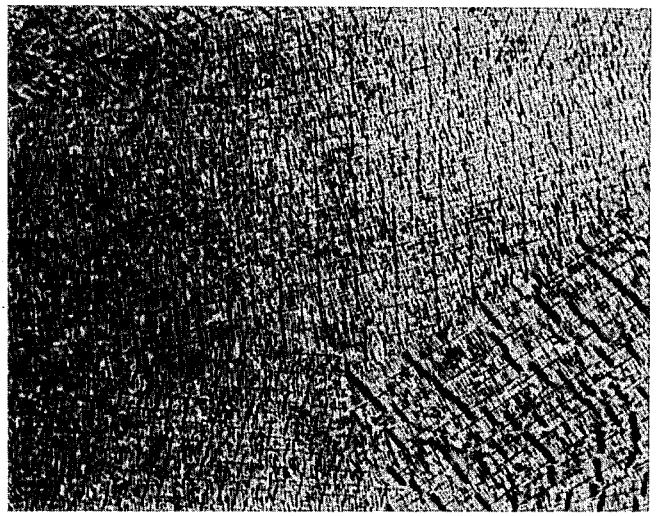
FIG. 4 is a 200X photomicrograph of an aluminum bronze bearing material as deposited prior to heat treatment.
Figure 5:
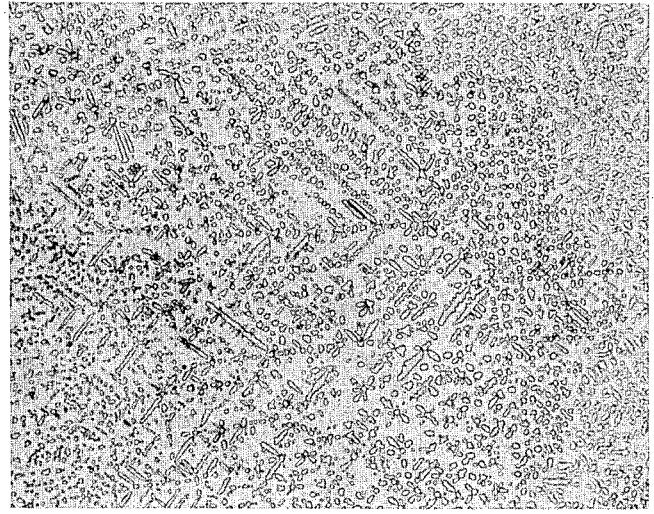
FIG. 5 is a 200X photomicrograph of material such as that shown in FIG. 4 but as it appears after heat treatment.

It has been found that when treated by this procedure, the microstructure of the aluminum bronze is drastically altered. The photomicrographs of FIGS. 4 and 5 show the manner in which the structure has been altered. In FIG. 4 the grain of the uncarburized and untreated aluminum bronze is quite fine and the particle shape is generally very uniform. After treatment, as described above, the microstructure is illustrated in FIG. 5 to be quite different from that of the material in FIG. 4. There are relatively small rounded particles which are of quite different shape and of larger size than the particles of the material of FIG. 4. Then there are considerably larger particles, most of which have elongated shapes and those elongated particles are much broader or wider than the elongated particles illustrated in FIG. 4. It will be seen by comparing FIGS. 4 and 5, that the treated aluminum bronze according to my invention, comprises considerably larger particles which are much more widely spaced than the very small closed spaced particles of the untreated material of FIG. 4.

Alternatively, the aluminum bronze material is applied to the grooves in the cone by means of tungsten inert gas process which is well known. The rotary cone cutter with the aluminum bronze weld overlay in the grooves 32 is then subjected to a carburizing atmosphere at a heat of 1700° F. for 10 to 14 hours. The articles are then removed from the carburizing furnace and quenched in oil. They are then tempered at 1200° F. for a period of approximately 8 hours, then heated to 1500° F., and then oil quenched. There is a final tempering operation at approximately 350° F. for a period of about 3 hours.

The aluminum bronze material is known by the trademark "Ampotrode 300". The material consists of 80% copper, 15% aluminum and 5% iron. While that is the specific material used by me, it should of course be understood that other aluminum bronzes could be used. At any rate this material, before heat treating, has a hardness of $39R_c$ and this hardness is uniform. After heat treating, the aluminum bronze particles have a hardness of $46R_c$ and the matrix through which they are dispersed has a hardness of $27R_c$. The hard metal such as indicated at 36 in the drawing, may for example have a hardness of $52R_c$ to $63R_c$.

A bearing material and bearing such as disclosed herein, is found to have very high wearing qualities and to provide a good smooth bearing surface, which of course must be adequately lubricated. When used with the hard metal overlay in the opposite relatively movable member, it provides bearing materials of different degrees of hardness, which is a desirable quality in bearings, although it has frequently been considered necessary in drilling oil wells that the shock and heat to which the bearings are subjected require that both bearing materials be of hard metal. However, with the heat treated aluminum bronze working with a hard metal overlay in the other relatively movable part, a highly desirable bearing action has been found to exist. While there is a difference in hardness of the two materials, namely, the hard metal overlay and the heat treated aluminum bronze overlay, the hardened particles found to be produced by heat treating aluminum bronze, are sufficiently hard to withstand the heavy work to which bearings in rock bits are subjected. With the improved life of rock bits on their working surfaces, due to the inserts of tungsten carbide, the failure point in bits of this type generally has been the bearings. With the bearing of my invention, the life expectancy of rock bits can be extended to a considerable degree.

It will of course be understood that changes can be made in the specific arrangements and figures disclosed herein without departing from the spirit of the invention.

I claim:

1. In a rotary rock drill body having an outwardly extending journal portion including a bearing surface of a predetermined hardness, and a rotary cone cutter rotating upon said portion, said cutter having an inner peripheral recess opposite said journal portion, bearing structure supported in said recess in journal portion engaging relation, said bearing structure comprising heat-treated aluminum bronze bearing composed of a bearing metal matrix of a first hardness and matrix-dispersed bearing particles of a second hardness greater than said matrix hardness and less than said predetermined journal portion bearing surface hardness whereby said bearing surface is adapted for relatively movable contact with the heat-treated aluminum bronze and said matrix dispersed particles therein.

2. Rotary rock drill body according to claim 1, in which said bearing particles have a hardness of about 46 $R_c$ and said bearing matrix a hardness of about 27 $R_c$.

3. Rotary rock drill body according to claim 1, in which said matrix-dispersed particles have a hardness at least 30% greater than the hardness of said matrix.

4. Rotary rock drill body according to claim 1, in which said matrix dispersed particles have a hardness from 10 $R_c$ to 17 $R_c$ less than the hardness of said journal portion bearing surface.

5. Rotary rock drill body according to claim 1, in which said journal portion bearing surface has a hardness of 52 $R_c$ to 57 $R_c$ and said matrix-dispersed particles have a hardness of 42 $R_c$ to 50 $R_c$.

6. In a rotary rock drill having a diagonally downward extending journal portion comprising a hard metal deposit defining a journal bearing structure of a predetermined hardness, and a rotary cone cutter journaled on said portion, said cutter having an inner peripheral recess opposite said journal bearing structure, the improvement comprising cutter bearing structure supported in said recess in hard metal bearing structure-engaging relation, said cutter bearing structure being formed of heat-treated aluminum bronze material consisting essentially of a bearing metal matrix of a first hardness and matrix dispersed bearing particles of a second hardness greater than said matrix hardness and less than said hard metal hardness.

7. Rotary rock drill body according to claim 6 in which said matrix-dispersed particles have a hardness at least 30% greater than the hardness of said matrix.

8. Rotary rock drill body according to claim 7 in which said matrix dispersed particles have a hardness from 10 $R_c$ to 17 $R_c$ less than the hardness of said journal portion bearing surface.

9. Rotary rock drill body according to claim 8 in which said journal portion bearing surface has a hardness of 52 $R_c$ to 57 $R_c$ and said matrix-dispersed particles have a hardness of 42 $R_c$ to 50 $R_c$.

10. In a rotary rock drill having a diagonally downward extending journal portion comprising a hard metal deposit defining a journal bearing structure of a predetermined hardness, and a rotary cone cutter journaled on said portion, said cutter having an inner peripheral recess opposite said journal bearing structure, the improvement comprising cutter bearing structure supported in said recess in hard metal bearing structure-engaging relation, said cutter bearing structure being formed of aluminum bronze material heat treated at about 1500° F. and consisting essentially of a bearing metal matrix of a first hardness and matrix dispersed bearing particles of a second hardness greater than said matrix hardness and less than said hard metal hardness.

* * * * *